United States Patent
Cho

(10) Patent No.: US 7,168,831 B2
(45) Date of Patent: Jan. 30, 2007

(54) FLICKERING DEVICE FOR AUTOMOBILE WHEEL

(76) Inventor: Yong Rak Cho, 281-21, Suyu 4 Dong, KangBuk Gu, Seoul (KR)

(*) Notice: Subject to any disclaimer, the term of this patent is extended or adjusted under 35 U.S.C. 154(b) by 185 days.

(21) Appl. No.: 10/894,039

(22) Filed: Jul. 19, 2004

(65) Prior Publication Data
US 2005/0195612 A1    Sep. 8, 2005

(30) Foreign Application Priority Data
Mar. 5, 2004  (KR) .................. 10-2004-0015049
Jun. 28, 2004 (KR) .................. 20-2004-0018180

(51) Int. Cl.
*B60Q 1/26* (2006.01)
*B60Q 1/02* (2006.01)
(52) U.S. Cl. ............................. 362/500; 362/545
(58) Field of Classification Search ............ 362/103, 362/192, 500, 543, 544, 545, 800, 812
See application file for complete search history.

(56) References Cited

U.S. PATENT DOCUMENTS

| 5,876,108 A | * | 3/1999 | Chien | ............ 362/103 |
| 2004/0130905 A1 | * | 7/2004 | Olds et al. | ............ 362/487 |
| 2004/0218397 A1 | * | 11/2004 | Luo | ............ 362/500 |

* cited by examiner

*Primary Examiner*—Y. My Quach-Lee
(74) *Attorney, Agent, or Firm*—John K. Park; Park Law Firm

(57) ABSTRACT

Disclosed herein is a flickering device for an automobile wheel. The flickering device flickers using electromotive force, generated by the interaction between magnetic force and a coil unit as a rotating body rotates, as an electric power source. The flickering device has a circuit board. The circuit board includes a sensor for detecting power generated by rotation of a rotating shaft and a speed of an automobile; a timer adapted to receive signals from the sensor, count predetermined time and operate; a cadmium sulfide element for detecting brightness of light and supplying current; a control unit for controlling components; and LEDs adapted to be operated under the control of the control unit.

3 Claims, 11 Drawing Sheets

FLICKERING DEVICE FOR AUTOMOBILE WHEEL

CROSS REFERENCE RELATED TO THIS APPLICATION

The applicant claims and requests a foreign priority, through the Paris Convention for the Protection of Industry Property, based on two patent applications each filed in the Republic of Korea (South Korea) with each filing date of Mar. 5, 2004 with the application number 10-2004-0015049, and Jun. 28, 2004 with the application number 20-2004-0018180, by the applicant. (See the Attached Declaration)

BACKGROUND OF THE INVENTION

1. Field of the Invention

The present invention relates to a flickering device for an automobile wheel, which is mounted on the hub of an automobile wheel, generates an electromotive force while the automobile wheel is rotated, and performs a flicker function using the electromotive force.

2. Description of the Related Art

In the case of flickering Light Emitting Diodes (LEDs) using a battery, a used battery must be replaced with a new battery, so that a high cost is incurred to replace the used battery with the new battery. In contrast, in the case of using a rechargeable battery, the rechargeable battery must be charged using an external power source and a charger, so that the recharging of the rechargeable battery is inconvenient.

Recently, in-line skates include light emitting devices in the rollers thereof, and the light emitting devices flash using an induced electromotive force. This is based on the most popularized technology of obtaining electromotive force. An electromotive force is generated as a coil unit connected to a stationary shaft through a bearing is rotated, and power is transmitted to these light emitting devices. When these conventional light emitting devices are applied to the rollers of the inline skates, the structures in which the conventional light emitting devices are contained must be constructed in circular form to ensure the smooth rotation thereof, so that the conventional light emitting devices have limitations in design and it is difficult to change the convention light emitting devices without hindrance.

Furthermore, the conventional light emitting devices simply operate LEDs. That is, the conventional light emitting devices have simple structures that do not take into consideration situations, such as the operational status of an automobile, and are just stopped by the shutting off of power. Recently, in the devices for flickering lamps using electromotive forces generated by rotating bodies, it is required to control the devices at day or in situations that do not need lighting.

Furthermore, a wheel cap to which the logo of a wheel manufacturer or automobile company is generally attached is mounted on the hub of a wheel made of aluminum, which is used to advertise or identify the logo.

In general, since an automobile is not provided with a function of lateral lighting, there occurs a problem in that a lateral collision accident may occur. Meanwhile, younger generations are interested in enhancing exteriors and interiors of automobiles trend to change wheels. However, wheels are too expensive, so that it is difficult to change wheels. Accordingly, it is too difficult to express an identity of their cars through wheels.

Furthermore, wheel manufacturers or automobile manufacturers have attached various logos to wheel hubcaps to achieve the effect of advertisement. However, it is difficult to identify the logos while the wheels are rotated by the operation of automobiles or automobiles are driven at night, thus deteriorating the effect of the advertisement.

SUMMARY OF THE INVENTION

Accordingly, the present invention has been made keeping in mind the above problems occurring in the prior art, and an object of the present invention is to provide a flickering device for an automobile wheel, which replaces a conventional wheel hubcap, and allows light to be emitted and logos to be identified while an automobile is stopped or driven.

Furthermore, the flickering device for an automobile wheel generates an electromotive force without using a separate external power source and uses the generated electromotive force as a power source, so that the flickering device does not impose a burden on an automobile, enables semi-permanent use, and allows convenient displacement and repair.

The flickering device for an automobile wheel can be used without discontinuance because it does not require a separate power source, and has a wide range of application because it can be applied to everything having wheels.

The flickering device for an automobile wheel can be applied to all devices having wheels. Even though the rotation of wheels influences a coil unit through a rotating shaft and a permanent magnet and LEDs are operated by power generated by the electromotive force of the coil unit, the generated power can be charged in the battery and then used, so that the LEDs can be operated while the electromotive force generated by the rotation of the wheels is not rotated, thus allowing the flickering device to be operated without discontinuance.

In order to accomplish the above object, the present invention provides a flickering device for an automobile wheel, the flickering device flickering using electromotive force, generated by interaction between magnetic force and a coil unit as a rotating body rotates, as an electric power source, the flickering device including:

a housing, a coupling ring inserted from the inside of a wheel hub to the outside thereof to couple the housing to a wheel, a deviation correction ring engaged with the coupling ring before combining with the housing to compensate for a gap because the gap may occur between the housing and the coupling ring when the housing and the coupling ring are combined with each other through the wheel hub in a screw manner while interposing the wheel therebetween and the thickness of the wheel hub is constructed to be thinner than a standard thickness, a stopper protrusion for stopping the deviation correction ring, a fastening hole formed through a portion of the coupling ring to prevent the housing and the coupling ring from being loosened from each other by external force, such as vibrations, during the operation of the automobile after the housing and the coupling ring are combined with each other in a screw manner, and a fastening pin tightened into the fastening hole;

a fastening shaft formed at the center of the inside of the housing, a magnetic core and a washer fitted on the fastening shaft, a frame seated on the housing, a power generation unit inserted into the lower end of the frame, a notch formed on one side of the lower end of the frame, and a power supply terminal fitted into the notch;

a weight partially inserted into the frame, a bearing inserted into a cylindrical depression formed at the center of the upper end of the frame, a bearing fastening protrusion formed on the fastening shaft of the housing passing through the bearing inserted into the cylindrical depression, and a bolt tightened into a fastening hole of the fastening shaft to combine the bearing, the frame and the housing with each other;

a circuit board seated on the frame, LEDs and elements mounted on the circuit board, a fastening protrusion formed on the frame to fasten the circuit board to the frame, and a fastening notch formed on the circuit board to be engaged with the fastening protrusion;

a cap seated on the circuit board, insertion recesses formed in the circumference of the cap to correspond to the LEDs mounted along the circumference of the circular circuit board, a fastening recess formed in the cap to fasten the cap to the frame and the circuit board, and a film coated on the surface of the top of the cap; and a transparent casing fitted into the housing to protect parts fastened to the housing, which range from the frame to the cap, a cover combined with the housing to protect the transparent casing, a cut-away portion formed in the cover to allow light emitted from the LEDs to pass therethrough, a fastening pin adapted to fasten the cover and the housing, and a fastening hole adapted to accommodate the fastening pin.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
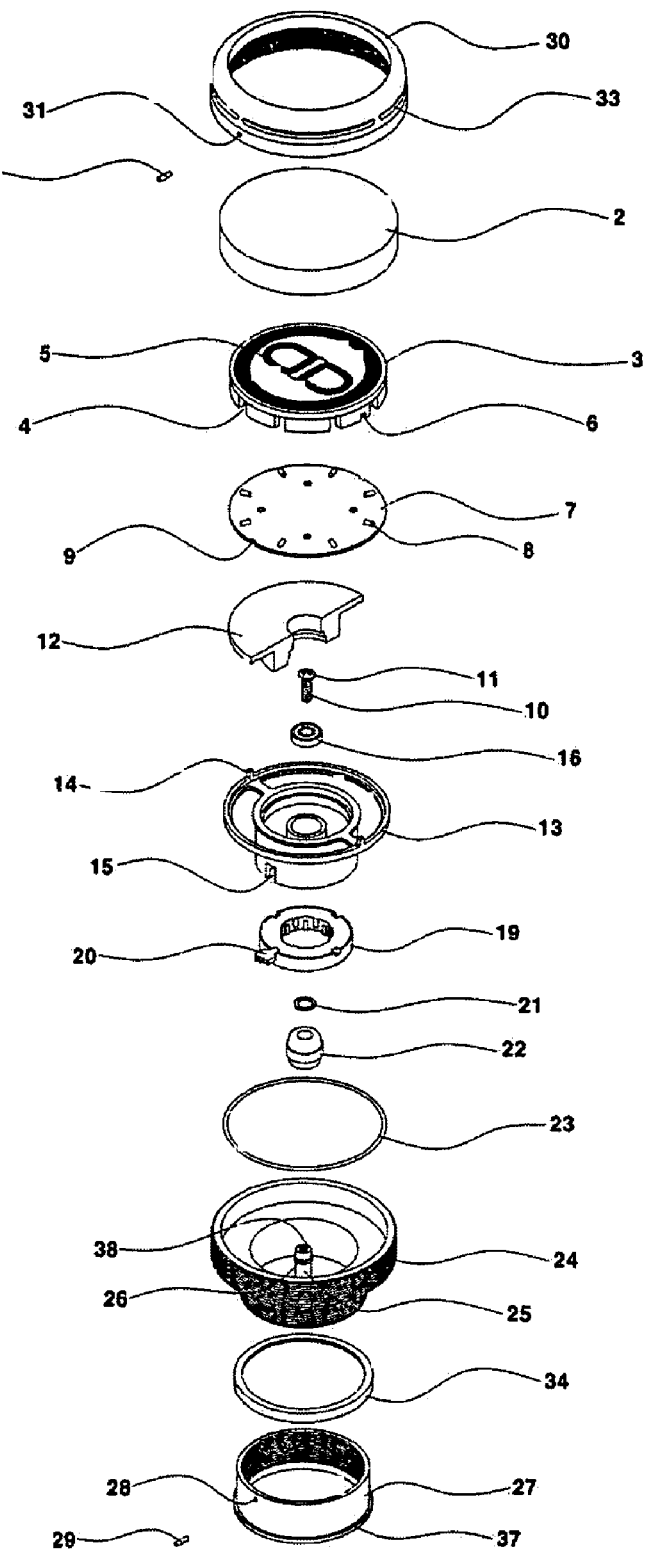
FIG. 1 is an exploded perspective view of a flickering device for an automobile wheel in accordance with the present invention.

Reference now should be made to the drawings, in which the same reference numerals are used throughout the different drawings to designate the same or similar components.

A flickering device 1 for an automobile wheel, in accordance with the present invention, includes:

a housing 24 capable of replacing an existing wheel hub, a coupling ring 27 inserted from the inside of a wheel hub 36 to the outside thereof to couple the housing 24 to a wheel 35, a deviation correction ring 34 engaged with the coupling ring 27 before combining with the housing 24 to compensate for a gap because the gap may occur between the housing 24 and the coupling ring 27 when the housing 24 and the coupling ring 27 are combined with each other through the wheel hub 36 in a screw manner while interposing the wheel 35 therebetween and the thickness of the wheel hub is constructed to be thinner than a standard thickness, a stopper protrusion 37 for stopping the deviation correction ring 34, a fastening hole 28 formed through a portion of the coupling ring 27 to prevent the housing 24 and the coupling ring 27 from being loosened from each other by external force, such as vibrations, during the operation of the automobile after the housing 24 and the coupling ring 27 are combined with each other in a screw manner, and a fastening pin 29 tightened into the fastening hole 28;

a fastening shaft 25 formed at the center of the inside of the housing 24, a magnetic core 22 and a washer 21 fitted on the fastening shaft 25, a frame 13 seated on the housing 24, a power generation unit 19 inserted into the lower end of the frame 13, a notch 15 formed on one side of the lower end of the frame 13, and a power supply terminal 20 fitted into the notch 15;

a weight 12 partially inserted into the frame 13, a bearing 16 inserted into a cylindrical depression 39 formed at the center of an upper end of the frame 13, a bearing fastening protrusion 26 formed on the fastening shaft 25 of the housing 24 passing through the bearing 16 inserted into the cylindrical depression 39, and a bolt 10 tightened into a fastening hole 38 of the fastening shaft 25 to combine the bearing 16, the frame 13 and the housing 24 with each other;

a circuit board 7 seated on the frame 13, LEDs 8 and elements mounted on the circuit board 7, a fastening protrusion 14 formed on the frame 13 to fasten the circuit board 7 to the frame 13, and a fastening notch 9 formed on the circuit board 7 to be engaged with the fastening protrusion 14;

a cap 3 seated on the circuit board 7, insertion recesses 4 formed in the circumference of the cap 3 to correspond to the LEDs 8 mounted along the circumference of the circular circuit board 7, a fastening recess 6 formed in the cap 3 to fasten the cap 3 to the frame 13 and the circuit board 7, and a film 5 coated on the surface of the top of the cap 3; and a transparent casing 2 fitted into the housing 24 to protect parts fastened to the housing 24, which range from the frame 13 to the cap 3, a cover 30 combined with the housing 24 to protect the transparent casing 2, a cutaway portion 33 formed in the cover 30 to allow light emitted from the LEDs to pass therethrough, a fastening pin 32 adapted to fasten the cover 30 and the housing 24, and a fastening hole 31 adapted to accommodate the fastening pin 32.

FIG. 1 is an exploded perspective view of a flickering device for an automobile wheel in accordance with the present invention. Descriptions of the components of the flickering device are the same as those provided above.

A circuit board 7 includes a sensor 41 for detecting the generation of power and the speed of an automobile, a timer 42 for receiving signals from the sensor 41, counting predetermined time and operating based on the counted time, a CaDmium Sulfide (CDS) element 43 for operating according to the brightness of light, an IC 44 for controlling components, and LEDs 8 for flicking in response to the control signal of the IC 44.

Figure 2:
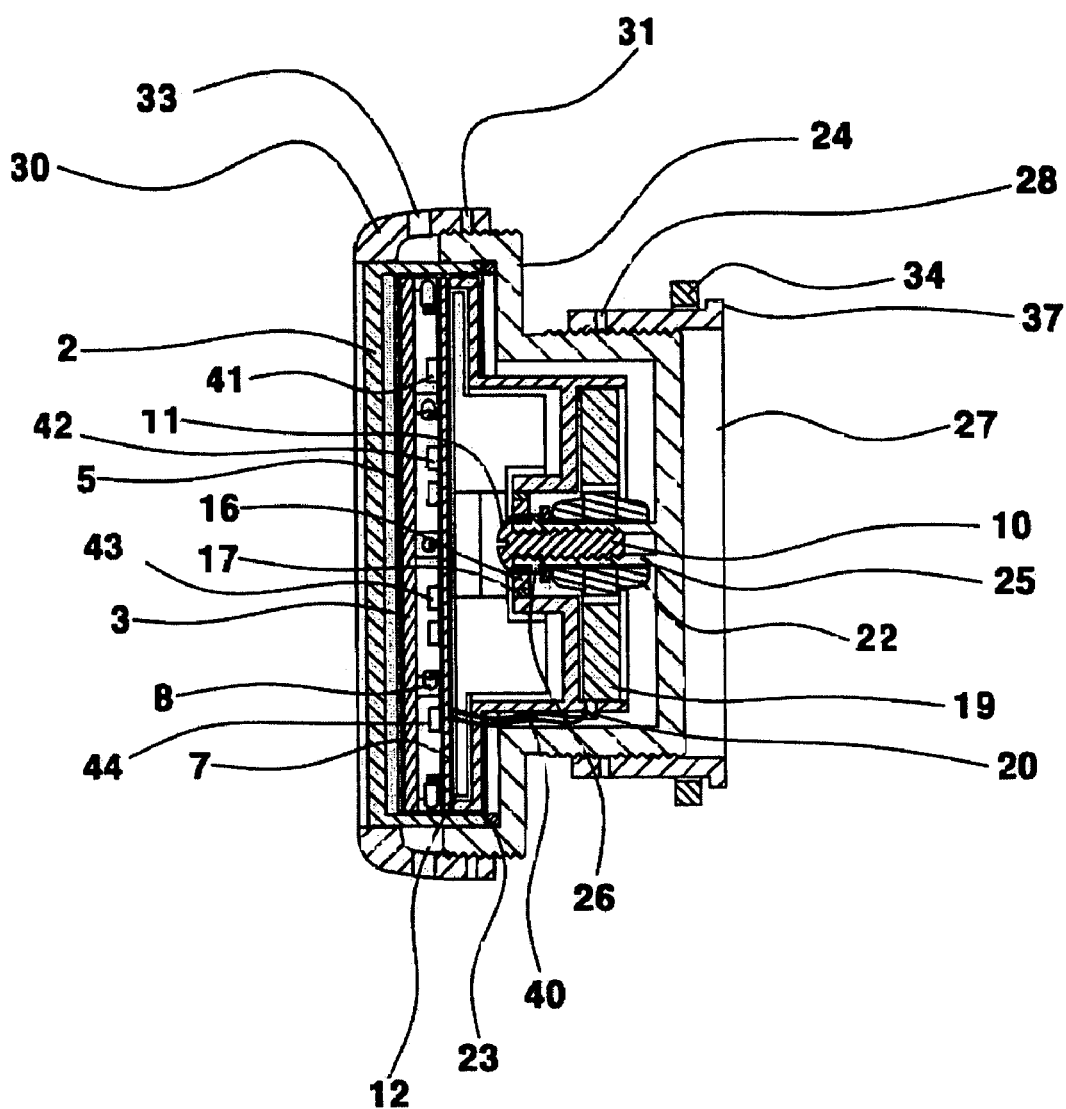
FIG. 2 is a sectional view showing the inner structure of the flickering device of the present invention.

FIG. 2 is a sectional view showing the inner structure of the flickering device of the present invention. The flickering device 1 for an automobile wheel may be divided into rotating elements that are rotated together with the automobile wheel 35, and stationary elements that are not rotated regardless of the rotation of the automobile wheel 35.

The rotating elements include the transparent casing 2, the bolt 10, the inside surface of the bearing 16, the core 22, a waterproof ring 23, the housing 24, the fastening shaft 25, the bearing fastening protrusion 26, the coupling ring 27, the cover 30, the deviation correction ring 34, and the stopper protrusion 37.

The stationary elements include the cap 3, the circuit board 7, the weight 12, the frame 13, the outside surface 17 of the bearing 16, and the power generation unit 19.

In the flickering device for an automobile wheel, the wheel 35 is rotated during the operation of an automobile. In this case, the LEDs 8 mounted on the circuit board 7 flicker with the assistance of the power generation terminal 20 of the power generation unit 19 and an electric line 40 using electromotive force, which is induced between the magnetic core 22 rotated together with the wheel 35 and the power generation unit 19 not rotated together with the wheel 35, as a power source. The elements mounted on the frame 13 are prevented from being rotated together with the wheel 35, by the weight 12 and the bearing 16.

In more detail, the bearing 16 is secured to the frame 13 and the fastening shaft 25 of the housing 24 using the bolt 10. The bolt 10 secures the inside surface 18 of the bearing 16 in such a way that the size of the head 11 of the bolt 10 is prevented from exceeding that of the inside surface 18 of the bearing 16. Accordingly, during the rotation of the housing 24, only the inside surface 18 of the bearing 16 is rotated, but the outside surface 17 of the bearing 16 secured to the frame 13 is not rotated. When the wheel 35 is rotated at high speeds or the function of the bearing 16 is not effectively performed, the frame 13 may be partially rotated. Since the weight 12 mounted on the frame 13 is located in the lower portion of the frame 13 with the assistance of gravity, the rotation of the frame 13 is suppressed, so that the frame 13 and elements combined with the frame 13 are not rotated.

Figure 3:
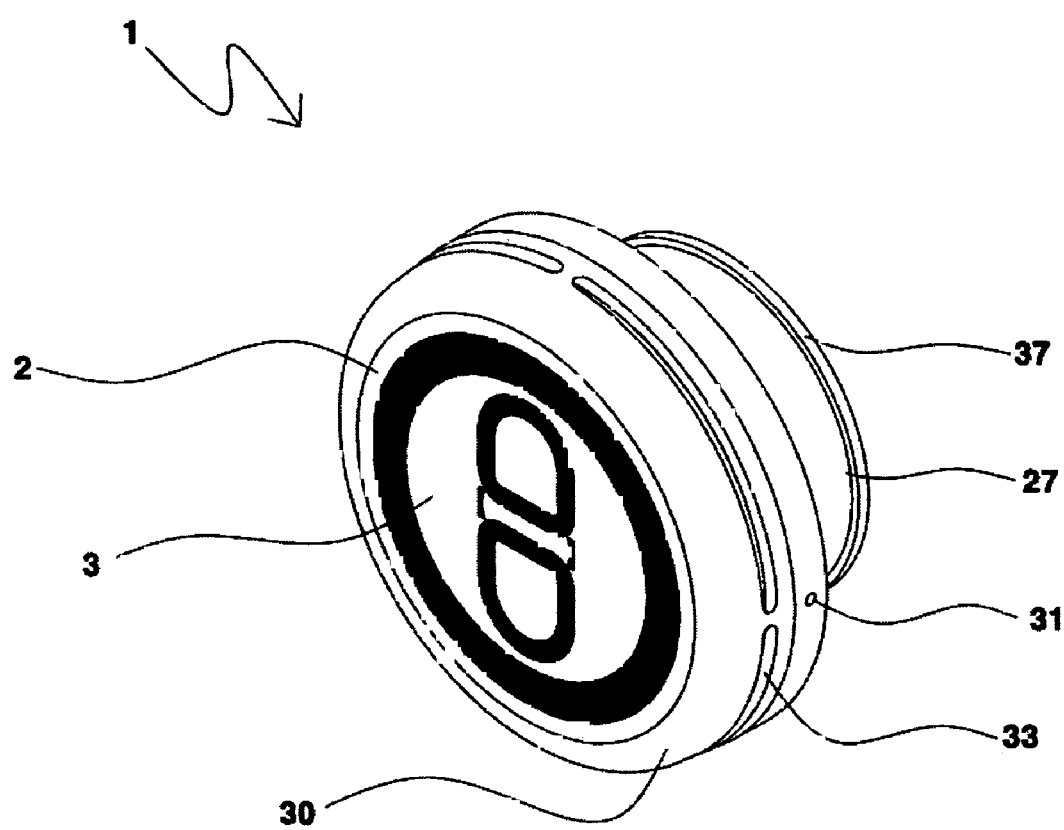
FIG. 3 is a perspective view showing the assembled flickering device for an automobile wheel in accordance with the present invention.
Figure 6:
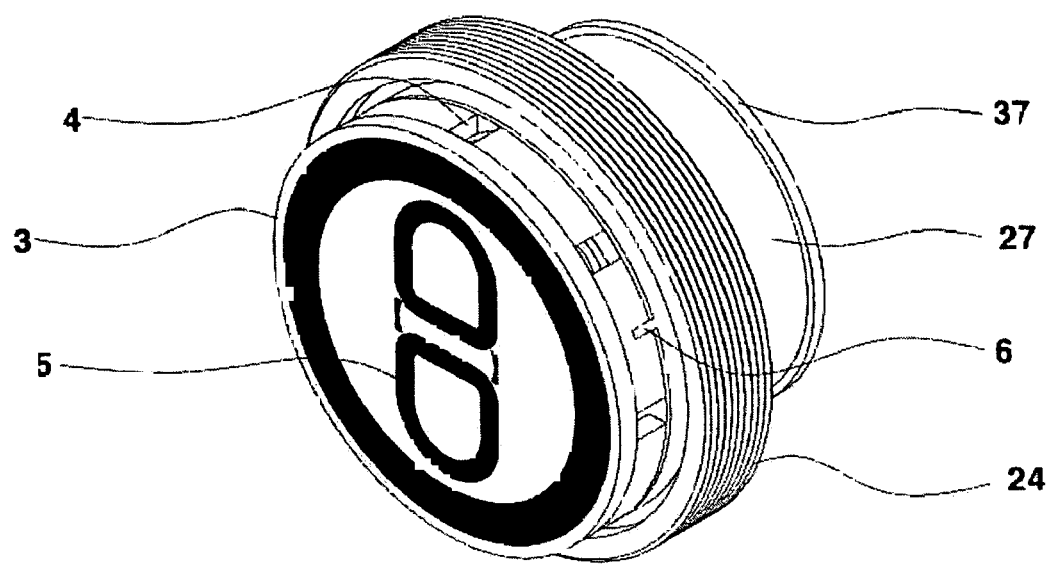
FIG. 6 is a perspective view showing the flickering device for an automobile wheel with the transparent casing being removed from the flickering device.
Figure 7:
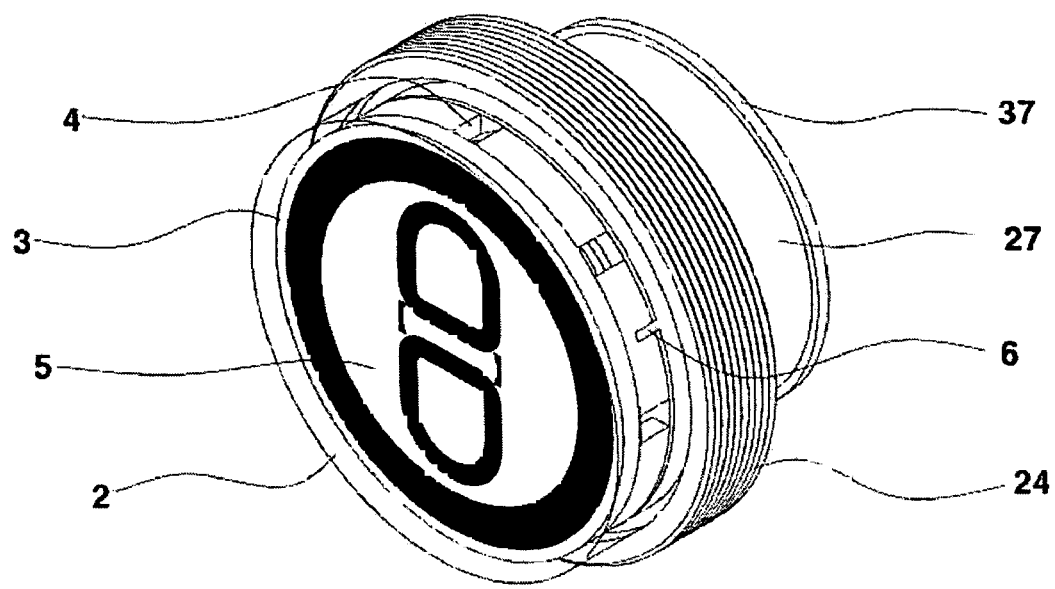
FIG. 7 is a perspective view showing the flickering device for an automobile wheel with the transparent casing being removed from the flickering device.

FIG. 3 is a perspective view showing the assembled flickering device for an automobile wheel in accordance with the present invention. FIG. 6 is a perspective view showing the flickering device for an automobile wheel with the transparent casing being removed from the flickering device. FIG. 7 is a perspective view showing the flickering device for an automobile wheel with the transparent casing being removed from the flickering device. As seen from the drawings, the flickering device for an automobile wheel is mounted on the wheel hub 36. The cover 30, the transparent casing 2 and a part of the housing 24 are viewed from the outside. The cap 3 protected by the transparent casing 2 is provided with a film 5 so that the logo of a wheel manufacturer or an automobile company or the character of the user can be freely attached thereto. Since the film 5 is preferably formed to harmonize with the locations of the LEDs 8 mounted on the circuit board 7, the circuit board 7 and the cap 3 constitute a set. A distinction of a logo can be increased by locating the LEDs 8 under a specific portion of the logo represented on the film 5.

Furthermore, the transparent casing 2 is an element that is rotated together with the wheel 35 during the rotation of the wheel 35. The transparent casing 2 is preferably fitted inside and brought into tight contact with the housing 24 to avoid friction with other stationary elements. The waterproof ring 23 is inserted between the combined housing 24 and transparent casing 2, as shown in FIG. 1.

Figure 4:
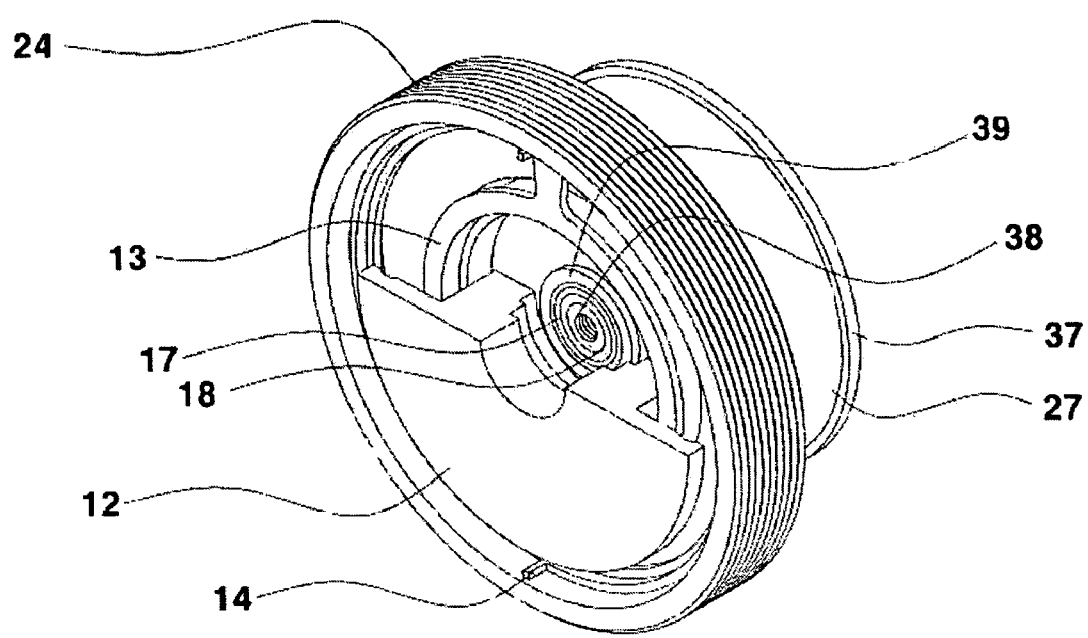
FIG. 4 is a perspective view showing partially assembled parts of the flickering device of the present invention.
Figure 5:
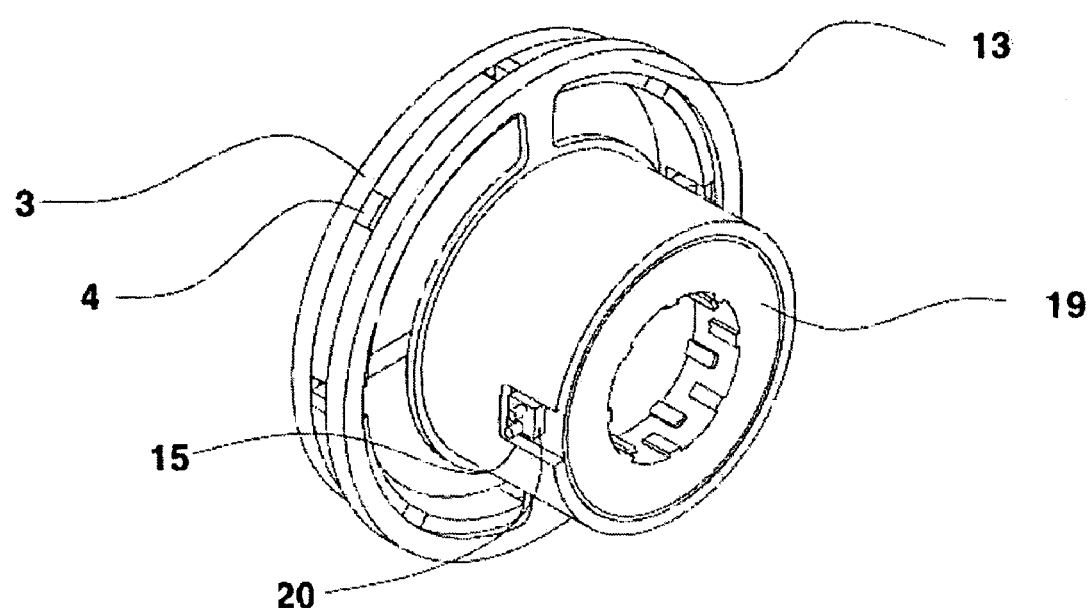
FIG. 5 is a perspective view showing a portion of the flickering device around the power generation unit.

FIG. 4 is a perspective view showing partially assembled parts of the flickering device of the present invention. FIG. 5 is a perspective view showing a portion of the flickering device around the power generation unit. FIGS. 4 and 5 show the frame 13, the bearing 16 and the weight 12 attached to the front of the housing 24, and the power generation unit 19 attached to the back of the housing 24.

The weight 12 is made in a semicircular shape. The weight 12 may be made of lead, but is not limited to lead. The weight 12 can be made in various forms, in which case it is desirable to take the use and weight of the body into consideration.

Figure 8:
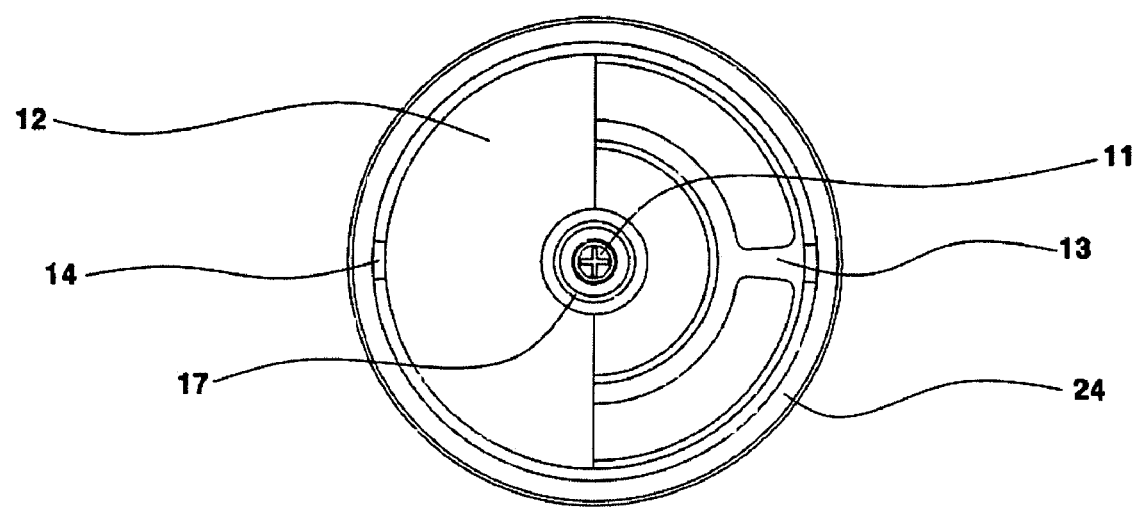
FIG. 8 is a front view showing the flickering device of FIG. 4 to which the bolt is tightened.
Figure 9:
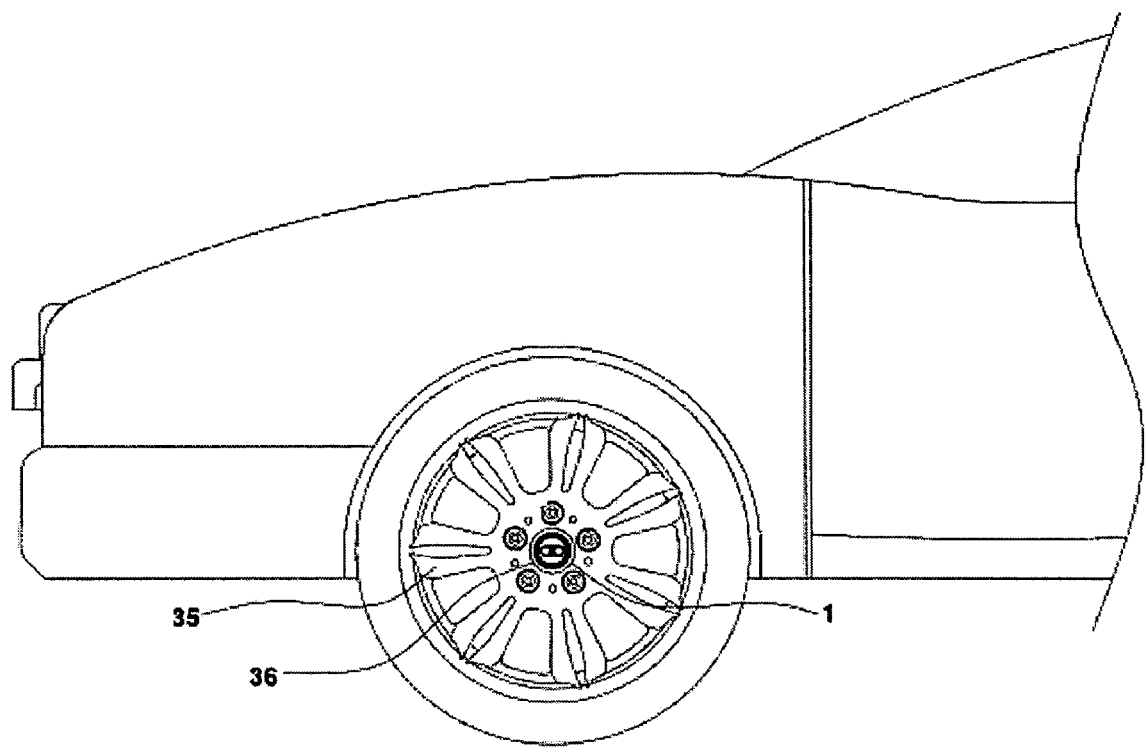
FIG. 9 is a view in which the flickering device of the present invention is applied to an automobile wheel.

FIG. 8 is a front view showing the flickering device of FIG. 4 to which the bolt 10 is tightened. This drawing shows the bolt 10 and the weight 12 so as to illustrate that, as described in detail with reference to FIG. 2, the bearing 16 is secured to the frame 13 and the fastening shaft 25 of the housing 24, but the bolt 10 secures only the inside surface 18 of the bearing 16 in such a way that the size of the head 11 of the bolt 10 is designed to be smaller than that of the inside surface 18 of the bearing 16, so that only the inside surface 18 of the bearing 16 is rotated and the outside surface 17 of the bearing 16 secured to the frame 13 is not rotated during the rotation of the housing 24.

Figure 10:
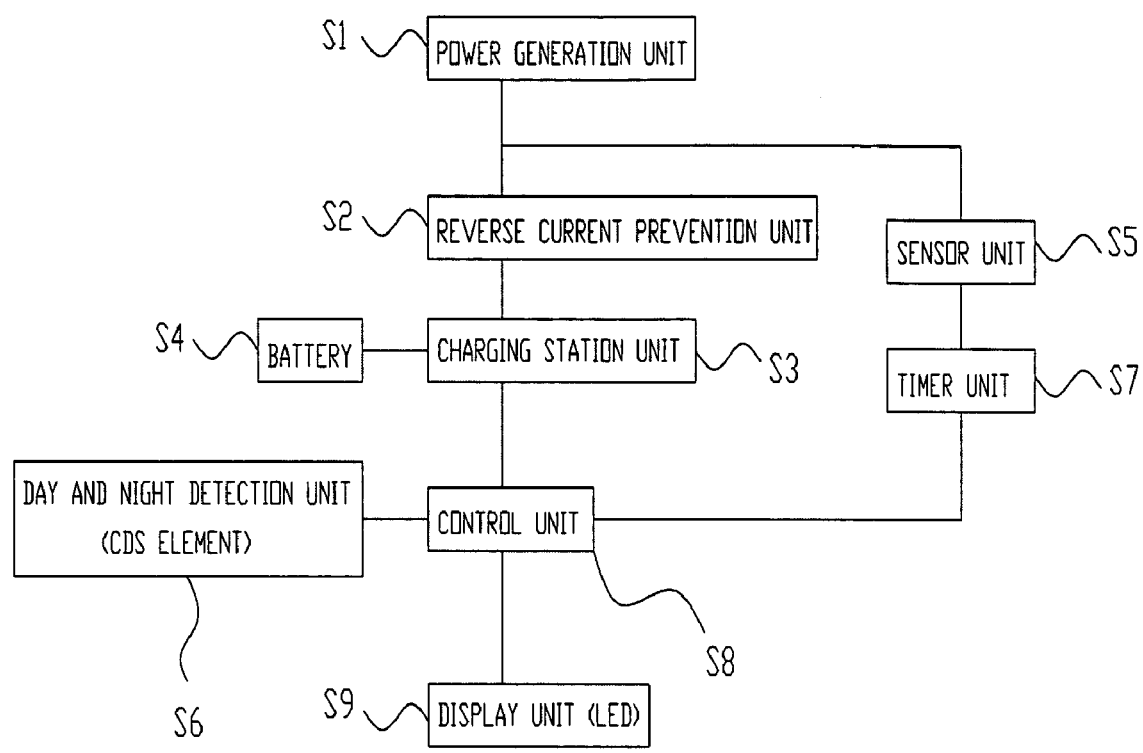
FIG. 10 is a block diagram of the circuit board of the flickering device in accordance with the present invention.
Figure 11:
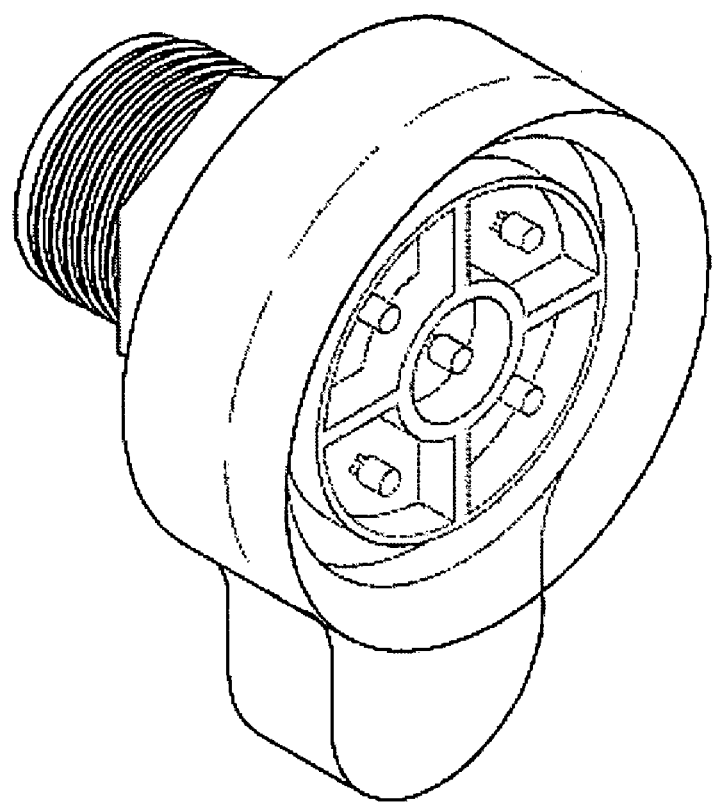
FIG. 11 is a perspective view showing a flickering device for an automobile wheel in accordance with another embodiment of the present invention.

FIG. 10 is a block diagram of the circuit board of the flickering device in accordance with the present invention. Power generated through the magnetic core 22 and the power generation unit 19 during the rotation of the housing 24 charges the battery S4 contained in a charging station unit S3. When the charge is completed, a control circuit controls charge to prevent overcharge in the charging station unit S3. The charging station unit S3 supplies power to a control unit S8 as soon as the charging is performed. The charging station unit S3 is provided with a reverse current prevention unit S2 to prevent current from being reversed to a power generation unit S1 having a low resistance value as the generation of electromotive force is stopped when the rotation of a rotating shaft is halted.

In the other drawings, the battery S4 and the charging station unit S3 are not illustrated, but they are mounted on the circuit board. The charging unit S4 and the charging station unit S3 are implemented using general technologies.

Furthermore, the control unit S8 is provided with the sensor S5 and the timer S7. The timer S7 having received signals from the sensor S5 for sensing power or the rotational speed of the housing 24 contains a clock function, so that it can count predetermined time and operates based on the counted time. Accordingly, power is supplied to the battery S4 when an automobile is stopped, but power is automatically shut off after the elapse of time to provide for the case where an automobile is not used for a long time, like the case where the automobile is turned on and parked.

Furthermore, the control unit S8 is provided with a night and day detecting unit S6 formed of cadmium sulfide. As a result, since the resistance value of the CDS element 43 becomes small when the surroundings around the CDS element 43 are bright, current that must flow into the transistor branches off to the CDS element 43, so that the collector and emitter of the transistor are connected to each other. Since the resistance value of the CDS element 43 becomes large when the surroundings around the CDS element 43 are dark, it is difficult for current to flow into the CDS element 43 and most of current flowing through the base bias resistance flows between the collector and emitter of the transistor, so that the operation of the LEDs 8 is started, thus activating the display unit S9.

As described above, the present invention provides the flickering device for an automobile wheel, which can be applied to rotating objects in various ways. In particular, the flickering device for an automobile wheel according to the present invention has a structure that can replace an existing hubcap that is mounted on the wheel or wheel cover of an automobile. Accordingly, the flickering device for an automobile wheel solves the problem of the lack of a side lamp that causes most of side collisions during the operation of an automobile at night, and decorates the appearance of the automobile. The flickering device for an automobile wheel does not incur additional maintenance fees, and enables the various controls of flickering and operation.

Although the preferred embodiments of the present invention have been disclosed for illustrative purposes, those skilled in the art will appreciate that various modifications, additions and substitutions are-possible, without departing from the scope and spirit of the invention as disclosed in the accompanying claims.

What is claimed is:

1. A flickering device for an automobile wheel, the flickering device flickering using electromotive force, generated by interaction between a magnetic force and a coil unit as a rotating body rotates, as an electric power source, the flickering device comprising:

a housing, a coupling ring inserted from an inside of an wheel hub to an outside thereof to couple the housing to a wheel, a deviation correction ring engaged with the coupling ring before the coupling ring combining with the housing to compensate for a gap which may occur between the housing and the coupling ring when the housing and the coupling ring are combined with each other through the wheel hub in a screw manner the wheel hub having a thickness thinner than a standard thickness, a stopper protrusion of the coupling ring for stopping the deviation correction ring, a fastening hole formed through a portion of the coupling ring to prevent the housing and the coupling ring from being loosened from each other by external force having vibrations, during the operation of the automobile after the housing and the coupling ring are combined with each other in a screw manner, and a fastening pin tightened into the fastening hole;

a fastening shaft formed at a center of an inside of the housing, a magnetic core and a washer fitted on the fastening shaft, a frame seated in the housing, a power generation unit inserted into a lower end of the frame, a notch formed on one side of a lower end of the frame, and a power supply terminal of the power supply unit fitted into the notch;

a weight partially inserted into the frame, a bearing inserted into a cylindrical depression formed at a center of an upper end of the frame, a bearing fastening protrusion formed on the fastening shaft of the housing passing through the bearing inserted into the cylindrical depression, and a bolt tightened into a fastening hole of the fastening shaft to combine the bearing, the frame and the housing with each other;

a circular circuit board seated on the frame, LEDs and elements mounted on the circuit board, a fastening protrusion formed on the frame to fasten the circuit board to the frame, and a fastening notch formed on the circuit board to be engaged with the fastening protrusion;

a cap seated on the circuit board, insertion recesses formed in the circumference of the cap to correspond to the LEDs mounted along the circumference of the circular circuit board, a fastening recess formed in the cap to fasten the cap to the frame and the circuit board, and a film coated on a surface of a top of the cap; and a transparent casing fitted into the housing, a cover combined with the housing to protect the transparent casing, a cut-away portion formed in the cover to allow light emitted from the LEDs to pass therethrough, a fastening pin adapted to fasten the cover and the housing, and a fastening hole of the cover adapted to accommodate the fastening pin.

2. The flickering device as set forth in claim 1, wherein rotating elements including the transparent casing, the bolt, an inner side of the bearing, the core, a waterproof ring between the housing and the transparent casing, the fastening shaft, the stopper protrusion, the coupling ring, the cover, the deviation correction ring, and the bearing fastening protrusion; and stationary elements including the cap, the circuit board, the weight, the frame, an outer side of the bearing, and the power generation unit.

3. The flickering device as set forth in claim 1, wherein:

the cover, the transparent casing and a part of the housing are viewed from the outside;

the cap protected by the transparent casing is provided with the film at a top of the cap so that a logo of a wheel manufacturer or an automobile company or a character of the user can be freely attached thereto; and the circuit board and the cap constitute a set and a distinction of the logo is increased by locating the LEDs under a specific portion of the logo represented on the film which is formed to harmonize with locations of the LEDs mounted on the circuit board.

* * * * *